(12) United States Patent
Miyanaga

(10) Patent No.: US 11,198,475 B2
(45) Date of Patent: Dec. 14, 2021

(54) COWL TOP STRUCTURE

(71) Applicant: HONDA MOTOR CO., LTD., Tokyo (JP)

(72) Inventor: Hiroyo Miyanaga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/830,460

(22) Filed: Mar. 26, 2020

(65) Prior Publication Data
US 2020/0307710 A1 Oct. 1, 2020

(30) Foreign Application Priority Data

Mar. 27, 2019 (JP) .............. JP2019-059911

(51) Int. Cl.
*B62D 25/08* (2006.01)
*B60R 13/04* (2006.01)
*B62D 25/04* (2006.01)

(52) U.S. Cl.
CPC ............ *B62D 25/081* (2013.01); *B60R 13/04* (2013.01); *B62D 25/04* (2013.01)

(58) Field of Classification Search
CPC ........ B62D 25/081; B62D 25/04; B60R 13/04
USPC ........................................... 296/192, 193.06
See application file for complete search history.

(56) References Cited

U.S. PATENT DOCUMENTS 8,002,335 B2 * 8/2011 Usuda .................. B62D 29/001
296/192
8,602,487 B2 * 12/2013 Tanaka ................ B62D 25/081
296/192
9,114,694 B2 * 8/2015 Sasaki ..................... B60J 10/25

FOREIGN PATENT DOCUMENTS

| JP | 2006-248405 A | 9/2006 |
| JP | 2011-098621 A | 5/2011 |
| JP | 2012-001193 A | 1/2012 |
| JP | 2012-232614 A | 11/2012 |
| JP | 5081107 B2 | 11/2012 |
| JP | 2015-044493 A | 3/2015 |

OTHER PUBLICATIONS

Office Action received in corresponding Japanese application No. 2019-059911 dated Jan. 26, 2021 with English trasnlation (6 pages).

* cited by examiner

*Primary Examiner* — Dennis H Pedder
(74) *Attorney, Agent, or Firm* — Rankin, Hill & Clark LLP

(57) ABSTRACT

Included are a cowl top arranged in a front portion of a vehicle, and extending in a vehicle width direction; a front pillar arranged in a side portion of the vehicle, and extending such that the front pillar becomes located higher toward a rear; and a garnish extending frontward from a front end part of the front pillar, and curving to a vehicle width inner side to be connected to a vehicle width outer end part of the cowl top. The cowl top includes a vertical wall part extending in the vehicle width direction and in a vehicle up-down direction in the vehicle width outer end part, and a first locking part provided to a vehicle width inner end part of the garnish is locked in a front-rear direction with a long hole provided to the vertical wall part, and extending in the vehicle width direction.

5 Claims, 5 Drawing Sheets

COWL TOP STRUCTURE

BACKGROUND OF THE INVENTION

1. Field of the Invention

The present invention relates to a cowl top structure.

2. Description of the Related Art

For example, Japanese Patent No. 5081107 discloses a cowl top garnish including: three members, that is: a garnish center located in the center in a vehicle width direction; and two garnish sides located respectively on the left and right sides of the garnish center, wherein one opening is arranged in the garnish center while the other opening is arranged in either of the two garnish sides, a reference hole for attaching the garnish center to a cowl box is set near the one opening in the garnish center, and left and right end portions of the garnish center are attached to the cowl box in a way that allows the garnish center to shift in the vehicle width direction, and respectively overlap the garnish sides.

SUMMARY OF THE INVENTION

In the above conventional cowl top structure, the garnish provided to a front end of a front pillar is locked with a cowl top in a vehicle up-down direction. Thus, the conventional cowl top structure is incapable of allowing the front pillar to be displaced in a vehicle front-rear direction due to expansion and contraction.

Accordingly, when an amount of displacement is large, a garnish main body and a connection part are likely to be damaged.

An object of the present invention is to provide a cowl top structure which is capable of allowing the front pillar to be displaced in the vehicle front-rear direction by the expansion and contraction.

The present invention includes: a cowl top arranged in a front portion of a vehicle, and extending in a vehicle width direction; a front pillar arranged in a side portion of the vehicle, and extending such that the front pillar becomes located higher toward a rear of the vehicle; and a garnish extending frontward from a front end part of the front pillar, and curving to a vehicle width inner side to be connected to a vehicle width outer end part of the cowl top. The cowl top includes a vertical wall part extending in the vehicle width direction and in an up-down direction in the vehicle width outer end part of the cowl top, and a first locking part provided to a vehicle width inner end part of the garnish is locked in a front-rear direction with a long hole provided to the vertical wall part, and extending in the vehicle width direction.

The present invention can provide the cowl top structure which is capable of allowing the front pillar to be displaced in the vehicle front-rear direction by the expansion and contraction.

DETAILED DESCRIPTION OF THE EMBODIMENTS

An embodiment of the present invention will be hereinafter described with reference to the accompanying drawings depending on the necessity. The same components will be denoted by the same reference signs, and duplicated descriptions will be omitted. Directions will be described basically based on the front, rear, left, right, up and down from the driver unless otherwise indicated. In addition, a "vehicle width direction" means a "left-right direction."

Figure 1:
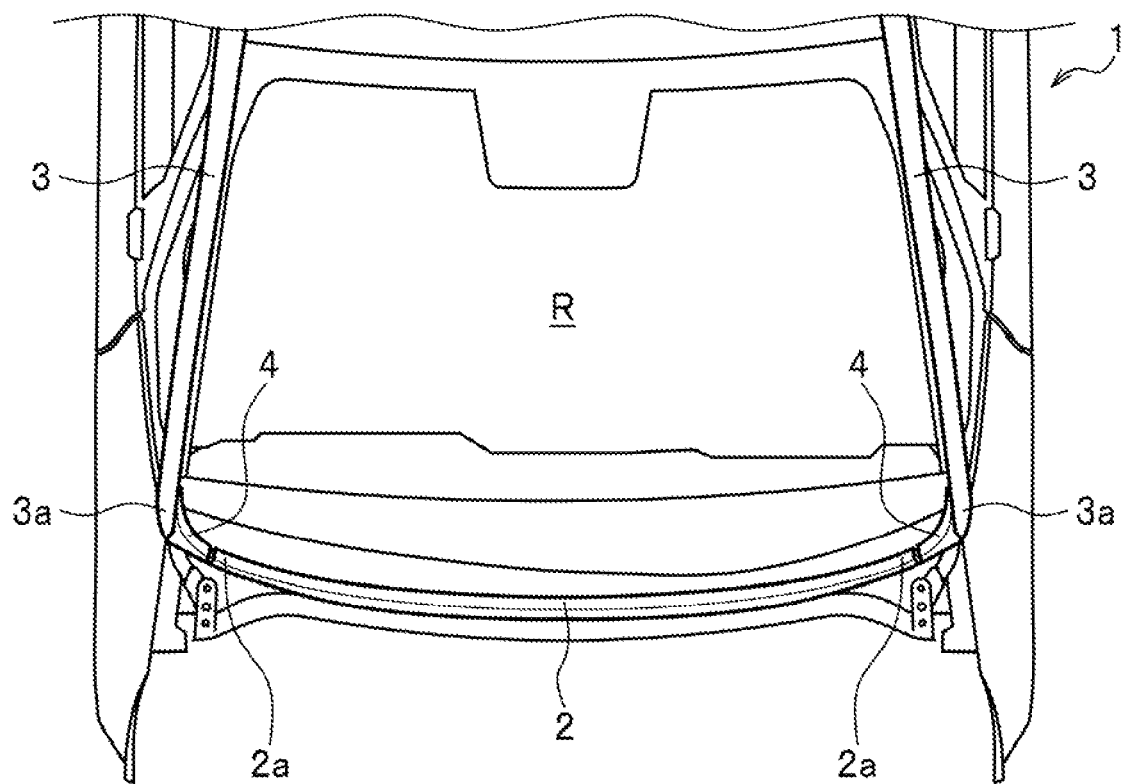
FIG. 1 is a top view illustrating an overall configuration of a front portion of a vehicle to which a cowl top structure according to an embodiment of the present invention is applied.

FIG. 1 illustrates a vehicle 1 to which a cowl top structure according to an embodiment of the present invention is applied.

A cowl top 2 is provided in a front portion of the vehicle 1. The cowl top 2 is arranged in front of a vehicle compartment R, and extends in the vehicle width direction.

In addition, a pair of left and right front pillars 3 are arranged respectively in side edges of the front portion of the vehicle compartment. The front pillars 3 inclines rearward and upward from front end parts 3a of the cowl top 2, and becomes located higher toward the rear.

Furthermore, the vehicle 1 according to the embodiment includes a pair of left and right garnishes 4. The garnishes 4 extend frontward from the front end parts 3a of the front pillars 3, and curve to a vehicle width inner side to be connected to vehicle width outer end parts 2a of the cowl top 2.

Figure 4:
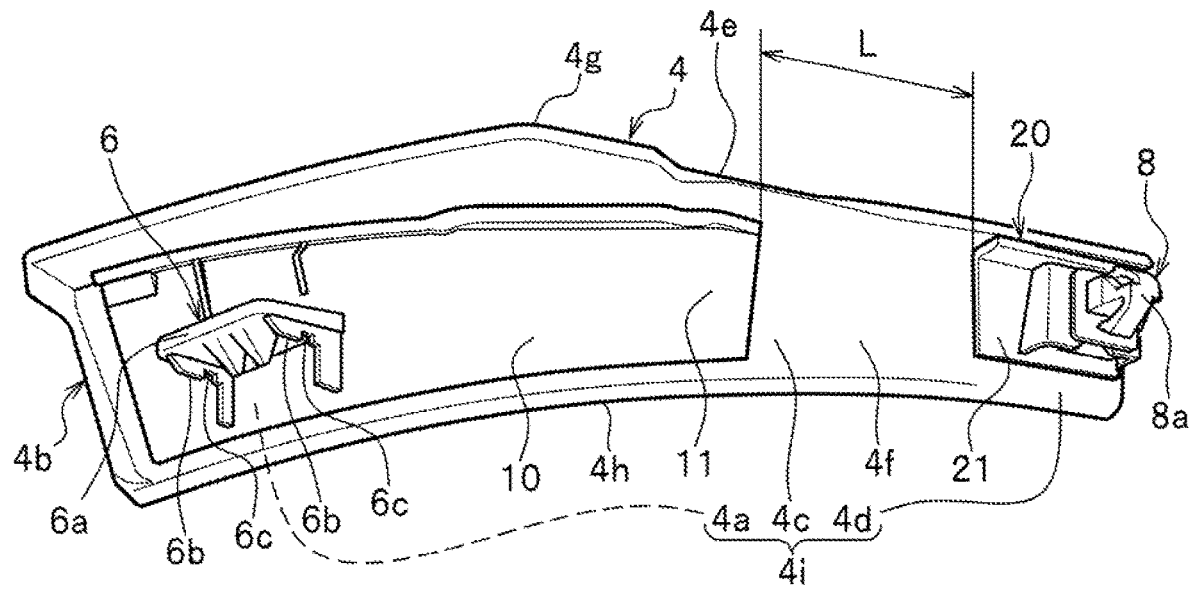
FIG. 4 is a perspective view of the garnish in the cowl top structure according to the embodiment, as viewed diagonally from below.

A first locking part 6 is provided a vehicle width inner end part 4b of each garnish 4 (see FIG. 4). The first locking part 6 includes: a tongue-shape locking piece 6a; reinforcement rib parts 6b, 6b provided on the locking piece 6a while projecting in an off-plate direction; and locking step parts 6c formed in the lower reinforcement rib parts 6b by cutting.

Figure 3:
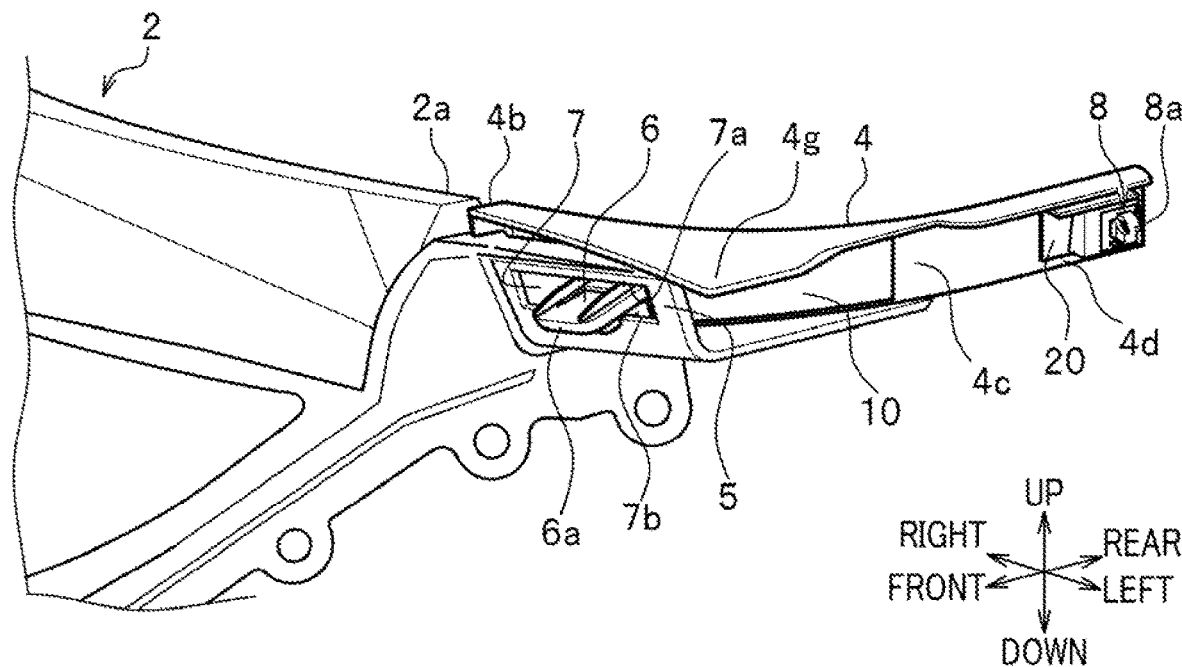
FIG. 3 is a perspective view illustrating how a first locking part of a garnish is locked with a long hole of the cowl top in the cowl top structure according to the embodiment.

The cowl top 2 includes a vertical wall part 5 extending in the vehicle width direction and upward in the vehicle width outer end part 2a of the cowl top 2 (see FIG. 3).

The vertical wall part 5 is provided with a rectangular long hole 7 extending in the vehicle width direction. The long hole 7 allows the locking piece 6a to insert through the long hole 7 in a vehicle front-rear direction, and to lock with the long hole 7.

A vehicle up-down direction size of an opening of the long hole 7 suppresses movement of the reinforcement rib parts 6b in the up-down direction by bringing the reinforcement rib parts 6b into contact with an upper peripheral edge 7a, and locks the locking step parts 6c (see FIG. 4) with a lower peripheral edge 7b.

In addition, a vehicle width direction size of the opening of the long hole 7 is formed larger than a width direction dimension of the locking piece 6a.

Thus, while the first locking part 6 locks with the long hole 7 in the vehicle front-rear direction, the locking piece 6a cannot come out of the long hole 7, and is slidable in the vehicle width direction, that is to say, in a longitudinal direction of the long hole 7. This allows the cowl top 2 and the garish 4 to move relative to each other in the vehicle width direction.

As illustrated in FIG. 4, the garnish 4 according to the embodiment includes a garnish main body 4i formed in the shape of a vertical wall, and serving as a skeleton while curving to the vehicle width inner side. The garnish main body 4i includes: a front surface part 4a provided with the first locking part 6, and arranged facing the vertical wall part 5 (see FIG. 3); a side surface part 4d provided with a second locking part 8 connected to the front end part 3a of the front pillar 3, and facing an inner surface of the front end part 3a; and an inclined surface part 4c formed curving between the front surface part 4a and the side surface part 4d which are substantially orthogonal to each other, and integrally connecting the front surface part 4a and the side surface part 4d to each other.

Furthermore, the garnish 4 is provided with an eaves part 4g (see FIG. 2) which is shaped substantially like a triangle in a top view, and which extends along an upper edge part 4e of the garnish main body 4i from the front surface part 4a to the inclined surface part 4c. Moreover, a lower edge part 4f of the garnish main body 4i is provided with a thick reinforcement flange 4h formed curving along the lower edge part 4f.

Besides, as illustrated in FIG. 4, the eaves part 4g is formed covering the vertical wall part 5 and the first locking part 6 from above by extending an apex portion of the substantially triangular shape toward an outside.

Figure 5:
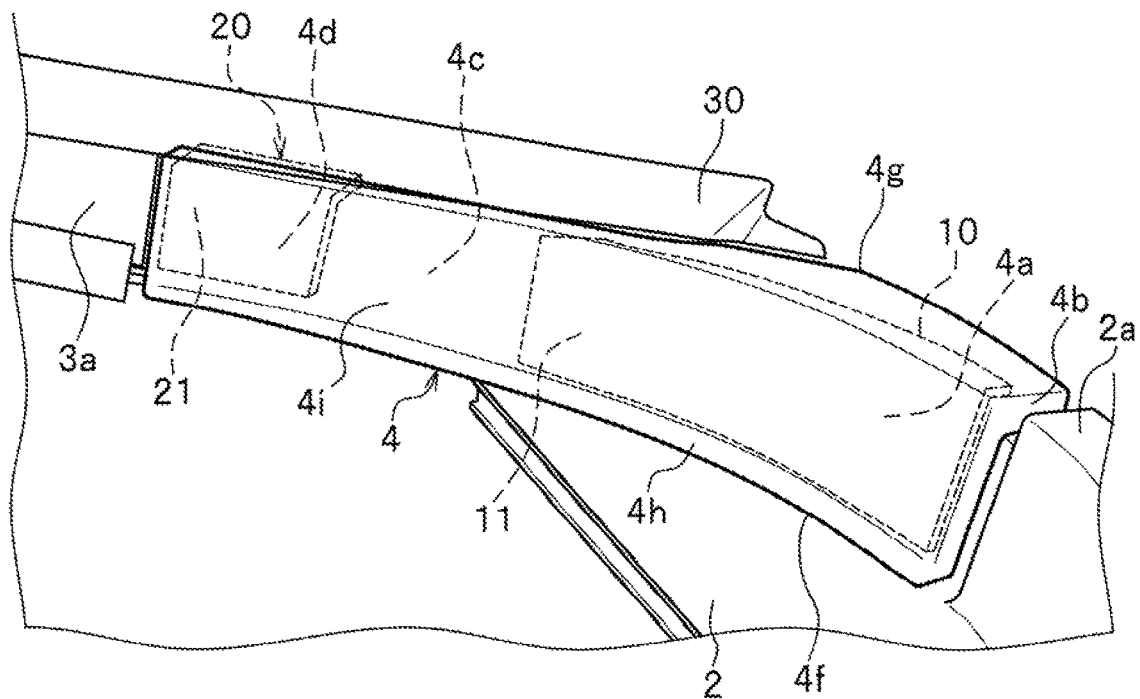
FIG. 5 is a perspective view for explaining an arrangement relationship between the garnish and a cover member in the cowl top structure according to the embodiment, as viewed from an inside of the vehicle.

In addition, the reinforcement flange 4h is formed curving along the lower edge part 4f of the garnish 4, and integral with the lower edge part 4f (see FIG. 5). Thus, even if load is applied to the garnish 4, the reinforcement flange 4h is capable of suppressing more deformation of the garnish 4 than necessary, for example, in order to prevent buckling deformation or the like from occurring.

In addition, the garnish 4 is provided with a first connection member 10 and a second connection member 20 which are formed from mutually-different materials. The first connecting member 10 is attached to the front surface part 4a of the garnish main body 4i, and is connected to the cowl top 2.

The first connection member 10 includes: the first locking part 6 locked with the cowl top 2; and a first extension part 11 formed in the shape of a flat plate, and extending along the front surface part 4a on a base end side of the first locking part 6.

Meanwhile, the second connection member 20 is attached to the side surface part 4d of the garnish main body 4i, and is connected to the front pillar 3.

The second connection member 20 includes: the second locking part 8 locked with the front pillar 3; and a second extension part 21 formed in the shape of a flat plate, and extending along the side surface part 4d on a base end side of the second locking part 8. The second locking part 8 is provided with a locking claw part 8a provided projecting from the second extension part 21 outward in the vehicle width direction.

Figure 7:
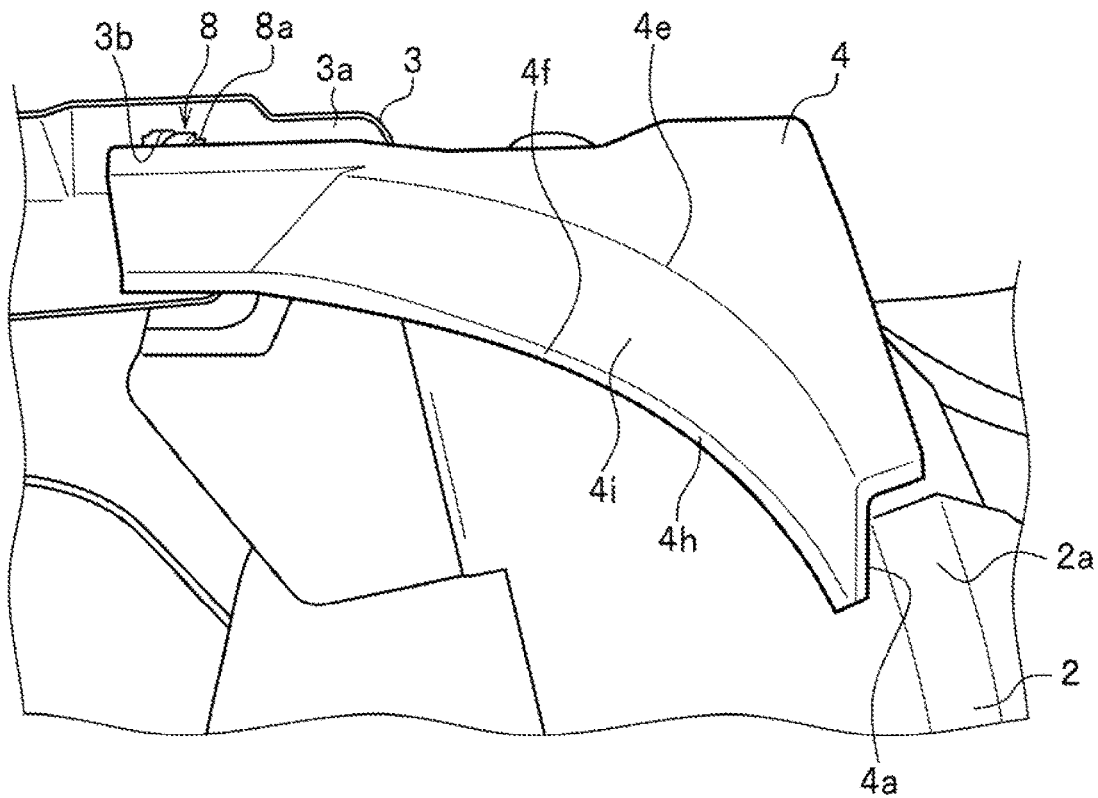
FIG. 7 is a perspective view of the garnish arranged in a connection part between the cowl top and the front pillar in the cowl top structure according to the embodiment, as viewed from the inside in the vehicle width direction.

Moreover, as illustrated in FIG. 7, a substantially rectangular locking opening 3b is opened in the front end part 3a of the front pillar 3. Besides, the locking claw part 8a is inserted into and locked with the locking opening 3b.

In addition, as illustrated in FIG. 4, in the cowl top structure according to the embodiment, a clearance with a predetermined distance L is set between the first extension part 11 and the second extension part 21.

Furthermore, as illustrated in FIG. 5, outside the garnish 4, a cover member 30 is provided corresponding to a portion where the first extension part 11 and the second extension part 21 are away from each other.

Figure 2:
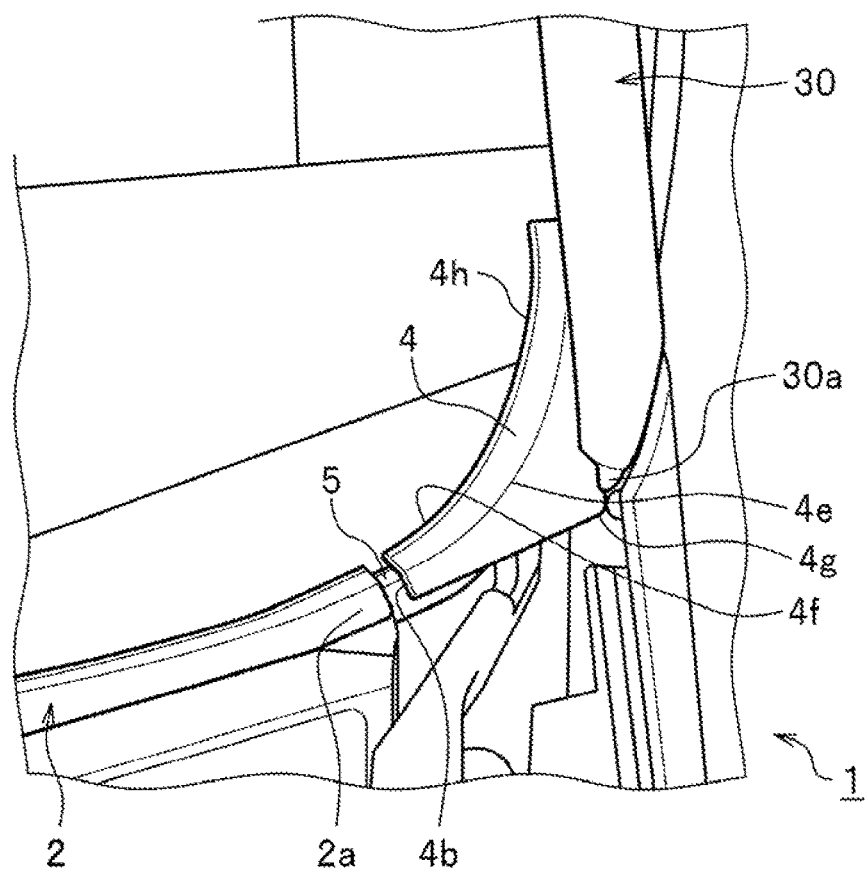
FIG. 2 is a magnified top view of a connection portion of the cowl top structure according to the embodiment mainly in a left side of the front portion of the vehicle, where a cowl top and a front pillar are connected together.

The cover member 30 according to the embodiment is made of a resin material, and extends from the front end part 3a of the front pillar 3 to a position of the apex portion formed in the eaves part 4g of the garnish 4 (see FIG. 2).

Thus, the clearance formed between the first extension part 11 and the second extension part 21 is covered with the cover member 30, and is accordingly invisible. This makes it possible to enhance the external appearance quality.

Moreover, rigidity of at least one of the first connection member 10 and the second connection member 20 is set higher than that of the garnish 4. In this respect, the first and second connection members 10, 20 are made of a resin material whose rigidity is higher than that of the garnish main body 4i. Thus, a portion of the garnish 4 corresponding to the clearance with the predetermined distance L, formed between the first extension part 11 and the second extension part 21, is capable of, through its deformation, absorbing displacement of the cowl top 2 or the front pillar 3 due to thermal deformation. Incidentally, the rigidity of the first and second connection members 10, 20 may be set higher than that of the garnish main body 4i by changing the thicknesses of the first and second connection members 10, 20.

Figure 6:
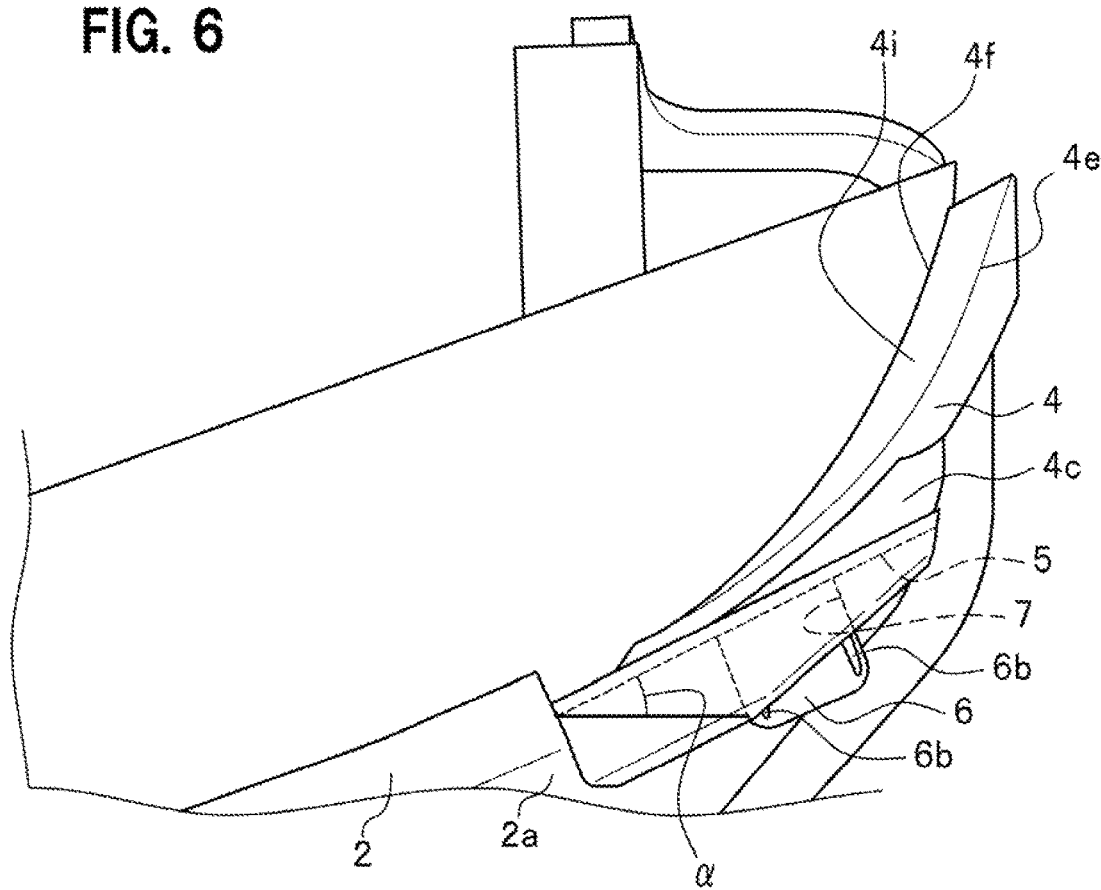
FIG. 6 is a plan view of a vertical wall part which locks the garnish with the long hole in the cowl top structure according to the embodiment.

Besides, as illustrated in FIG. 6, the vertical wall part 5 extends along the inclined surface part 4c of the garnish 4 toward the rear of the vehicle. In addition, as illustrated in FIG. 6, the vertical wall part 5 extends along the curve of the garnish 4 from the front surface part 4a to the inclined surface part 4c toward the rear of the vehicle.

The vertical wall part 5 according to the embodiment extends in the vehicle width direction while inclining to the rear at a predetermined angle α to the left-right direction.

Figure 8:
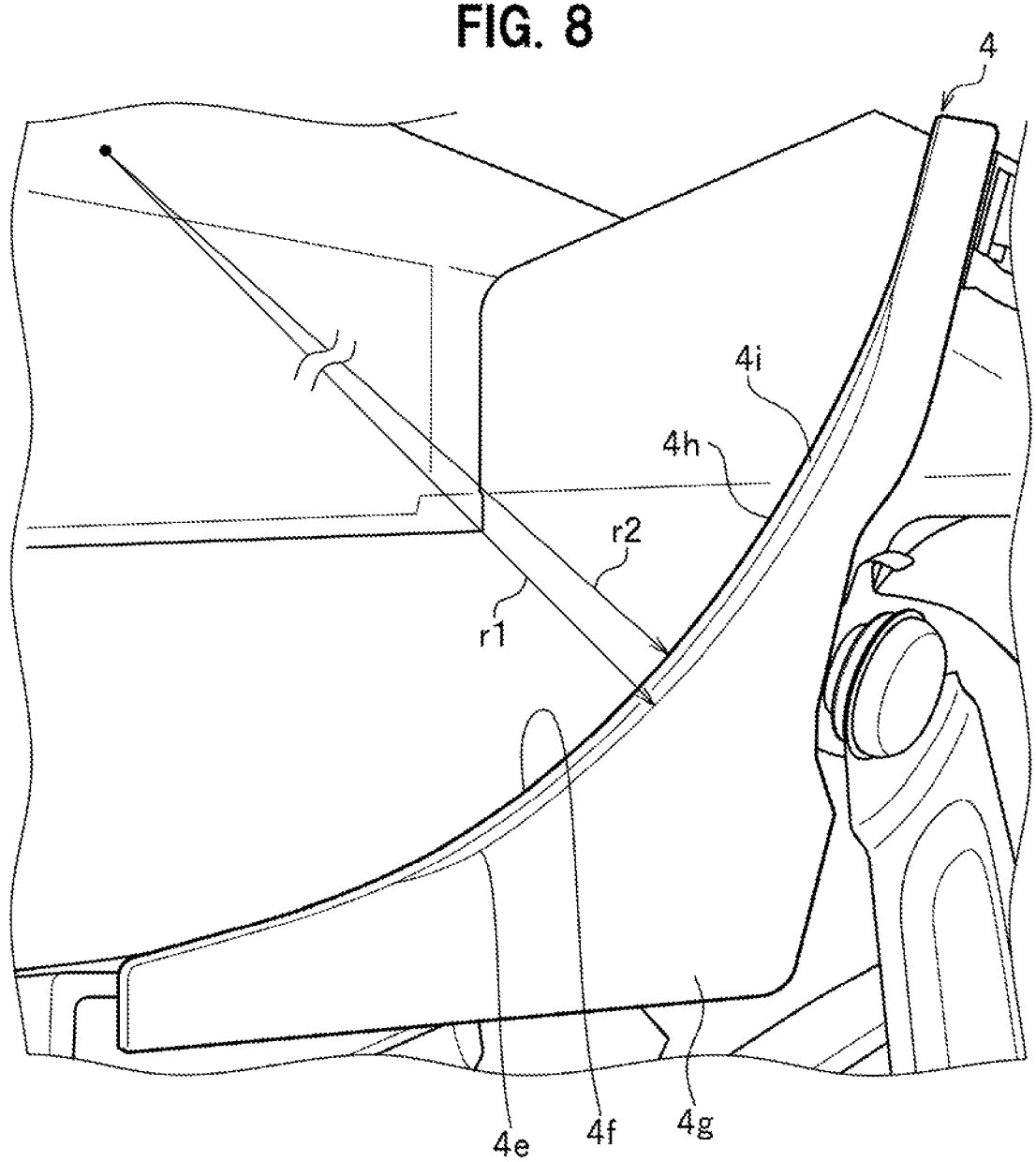
FIG. 8 is a top view illustrating a difference between a curvature of a curving upper edge part and a curvature of a curving lower edge part of the garnish in the cowl top structure according to the embodiment.

In addition, as illustrated in FIGS. 6 and 8, the garnish 4 is provided with the upper edge part 4e and the lower edge part 4f. Furthermore, as illustrated in FIG. 8, in the garnish 4, a curvature r1 of the curving upper edge part 4e and a curvature r2 of the curving lower edge part 4f are made different from each other (r1>r2).

Next, descriptions will be provided for effects and working of the cowl top structure according to the embodiment.

As illustrated in FIG. 3, the cowl top structure according to the embodiment includes: the cowl top 2 arranged in the front portion of the vehicle, and extending in the vehicle width direction; the front pillar arranged in the side portion of the vehicle, and extending such that the front pillar becomes located higher toward the rear of the vehicle; and the garnish 4 extending frontward from the front end part of the front pillar, and curving to the vehicle width inner side to be connected to the vehicle width outer end part 2a of the cowl top 2. The cowl top 2 includes the vertical wall part 5 extending in the vehicle width direction and in the up-down direction in the vehicle width outer end part 2a. The first locking part 6 provided to the vehicle width inner end part 4b of the garnish 4 is locked in the front-rear direction with the front-rear direction with the long hole 7 provided to the vertical wall part 5, and extending in the vehicle width direction.

The cowl top structure according to the embodiment is capable of allowing the front pillar 3 to be displaced in the vehicle front-rear direction due to the expansion and contraction.

Specifically, the cowl top 2 according to the embodiment locks the curving garnish 4, in the front-rear direction, with the long hole 7 of the vertical wall part 5 which extends in the vehicle width direction.

Thus, when the front pillar 3 is displaced in the front-rear direction due to its thermal deformation, the garnish 4 is displaced in the vehicle width direction, that is to say, in the direction in which the long hole 7 extends. The displacement of the garnish 4 in the front-rear direction can be absorbed by converting the displacement into the displacement in the vehicle width direction.

In addition, when the front pillar 3 expands, the clearance decreases between the vehicle width outer end part 2a of the cowl top 2 and the vehicle width inner end part 4b of the garnish 4.

Like this, the cowl top 2 according to the embodiment is capable of suppressing deterioration in the outer appearance quality due to damage and misalignment of the garnish 4.

Furthermore, as illustrated in FIG. 4, the garnish 4 includes: the front surface part 4a arranged facing the vertical wall part 5; the side surface part 4d integrally provided to the front surface part 4a with the inclined surface part 4c interposed in between; the first connection member 10 provided to the front surface part 4a, and connected to the cowl top 2; and the second connection member 20 provided to the side surface part 4d, and connected to the front pillar 3.

The first connection member 10 includes: the first locking part 6 locked with the cowl top 2; and the first extension part 11 extending along the front surface part 4a on the base end side of the first locking part 6.

Meanwhile, the second connection member 20 includes: the second locking part 8 locked with the front pillar 3; and the second extension part 21 extending along the side surface part 4d on the base end side of the second locking part 8.

Moreover, the first extension part 11 and the second extension part 21 are arranged away from each other by the predetermined distance L.

The clearance is formed between the first extension part 11 and the second extension part 21. Thus, the garnish 4 located in the clearance further expands and contracts to allow the front pillar 3 and the cowl top 2 to be displaced due to the thermal deformation. This makes it possible to suppress the deterioration in the external appearance quality and the damage.

As illustrated in FIG. 5, outside the garnish 4, the cover member 30 is provided in the place corresponding to the clearance in the portion where the first extension part 11 and the second extension part 21 are away from each other.

Thus, the clearance between the first extension part 11 and the second extension part 21 is covered with the cover member 30, and is accordingly invisible. In addition, even if the front pillar 3 and the cowl top 2 are displaced due to the thermal deformation, the clearance can be hidden. This suppresses the deterioration in the external appearance quality.

Furthermore, in the embodiment, the rigidity of at least one of the first connection member 10 and the second connection member 20 is set higher than that of the garnish 4.

Thus, the portion of the garnish 4 located between the first connection member 10 and the second connection member 20 is capable of being deformed and allowing the front pillar 3 and the cowl top 2 to be displaced due to the thermal deformation.

Besides, the vertical wall part 5 extends along the inclined surface part 4c of the garnish 4 toward the rear of the vehicle.

The vertical wall part 5 inclines rearward, and thus enables the displacement of the front pillar 3 due to the thermal expansion and contraction to be effectively released along the vertical wall part 5 in the vehicle width direction. Accordingly, the deterioration in the external appearance quality can be prevented.

In addition, in the garnish 4, the curvatures r1, r2 of the curving upper and lower edge parts 4e, 4f are made different from each other.

Thus, distortion caused by the thermal expansion and contraction can be dispersed instead of being concentrated in a particular part. Accordingly, the external appearance quality can be maintained even when the displacement occurs.

The present invention is not limited to the above-discussed embodiment, and can be variously modified. The foregoing embodiment has been exemplified for the purpose of explaining the present invention in an easy-to-understand way, and is not necessarily limited to what includes all the discussed components. In addition, an embodiment may be created based on one embodiment by replacing some of its components with some of the components of another embodiment, or by adding some of the components of another embodiment. Otherwise, an embodiment may be created based on one embodiment by removing some of its components, or by replacing some of its components with some of the components of another embodiment and adding some of the components of another embodiment. Examples of feasible modifications to the foregoing embodiment are as follows.

In the embodiment, as illustrated in FIG. 3, the rectangular long hole 7 extending in the vehicle width direction is formed in the vertical wall part 5. However, the long hole 7 is not specifically limited to this one. For example, the long hole 7 may be elliptic or the like. As long as the long hole 7 is provided to the vertical wall part 5 and extends in the vehicle width direction, no specific limitation is not imposed on the shape or arrangement position of the long hole 7, or the number of long holes 7.

In addition, in the embodiment, as illustrated in FIG. 4, the locking step parts 6c is formed in the lower reinforcement rib parts 6b by cutting, and are locked with the lower peripheral edge 7b (see FIG. 3). However, the locking parts are not limited to these ones. For example, no specific limitation is not imposed on the shape or material of the locking parts or the number of locking parts, as long as the locking parts are locked, in the front-rear direction, with the long hole 7 such as hook-shaped locking claws being locked with the opening peripheral edge of the long hole 7.

What is claimed is:
1. A cowl top structure comprising:
a cowl top arranged in a front portion of a vehicle, and extending in a vehicle width direction;
a front pillar arranged in a side portion of the vehicle, and extending such that the front pillar becomes located higher toward a rear of the vehicle; and a garnish extending frontward from a front end part of the front pillar, and curving to a vehicle width inner side to be connected to a vehicle width outer end part of the cowl top, wherein the cowl top includes a vertical wall part extending in the vehicle width direction and in an up-down direction in the vehicle width outer end part of the cowl top, a first locking part provided to a vehicle width inner end part of the garnish is locked in a front-rear direction with a long hole provided to the vertical wall part, and extending in the vehicle width direction, the garnish includes a front surface part arranged facing the vertical wall part, a side surface part provided integrally to the front surface part with an inclined surface part interposed in between, a first connection member provided to the front surface part, and connected to the cowl top, and a second connection member provided to the side surface part, and connected to the front pillar, the first connection member includes the first locking part locked with the cowl top, and a first extension part extending along the front surface part on a base end side of the first locking part, the second connection member includes a second locking part locked with the front pillar, and a second extension part extending along the side surface part on a base end side of the second locking part, and the first extension part and the second extension part are arranged away from each other.

2. The cowl top structure according to claim 1, wherein outside the garnish, a cover member is provided in a place corresponding to a portion where the first extension part and the second extension part are away from each other.

3. The cowl top structure according to claim 1, wherein rigidity of at least one of the first connection member and the second connection member is set higher than that of the garnish.

4. The cowl top structure according to claim 1, wherein the vertical wall part extends along the inclined surface part of the garnish toward the rear of the vehicle.

5. The cowl top structure according to claim 1, wherein in the garnish, a curvature of a curving upper edge part and a curvature of a curving lower edge part are made different from each other.

\* \* \* \* \*